United States Patent
Chan et al.

(10) Patent No.: US 9,989,415 B1
(45) Date of Patent: Jun. 5, 2018

(54) METHOD FOR CREATING UNIFORMITY COMPENSATION LOOK-UP TABLE

(71) Applicants: IEI INTEGRATION CORP., New Taipei (TW); ARMORLINK SH CORP., Shanghai (CN)

(72) Inventors: Kai-Cheng Chan, New Taipei (TW); Jhong-Hao Ye, New Taipei (TW); Chi-Heng Lu, New Taipei (TW)

(73) Assignees: IEI Intergration Corp., New Taipei (TW); Armorlink SH Corp., Shanghai (CN)

( * ) Notice: Subject to any disclaimer, the term of this patent is extended or adjusted under 35 U.S.C. 154(b) by 21 days.

(21) Appl. No.: 15/412,388

(22) Filed: Jan. 23, 2017

(51) Int. Cl.
G01D 18/00 (2006.01)
G01J 3/46 (2006.01)
G01J 3/50 (2006.01)
G06F 11/30 (2006.01)

(52) U.S. Cl.
CPC .............. G01J 3/462 (2013.01); G01J 3/506 (2013.01); G01J 2003/467 (2013.01)

(58) Field of Classification Search
CPC ....................................................... G01J 3/462
See application file for complete search history.

(56) References Cited

U.S. PATENT DOCUMENTS

2008/0170004 A1* 7/2008 Jung ................... G09G 3/3233
345/76
2011/0037774 A1* 2/2011 Chen ..................... G09G 3/006
345/589

* cited by examiner

*Primary Examiner* — Phuong Huynh
(74) *Attorney, Agent, or Firm* — Rosenberg, Klein & Lee

(57) ABSTRACT

A method for creating a uniformity compensation look-up table is revealed. The method includes the following steps. First measure a plurality of areas on a plane users intend to make uniform to get a measured value of the respective area. Then get a central uniform estimate of a center of the plane. Also get a linear skeleton according to the position of one of the measured values and the position of the central uniform estimate. Next get a plurality of skeletal uniform estimates on the linear skeletons respectively by interpolation or extrapolation of the measured values, the central uniform estimate, and the distance between the position of the measured values and the center of the plane. At last get a plurality of planar uniform estimates on the plane in turn according to the skeletal uniform estimates of the two adjacent linear skeletons to establish the look-up table.

8 Claims, 11 Drawing Sheets

METHOD FOR CREATING UNIFORMITY COMPENSATION LOOK-UP TABLE

BACKGROUND OF THE INVENTION

Field of the Invention

The present invention relates to a method for creating a compensation stable, especially to a method for creating a uniformity compensation look-up table.

Descriptions of Related Art

Along with progressive development of visual technology, high definition liquid crystal displays or plasma display panels have attracted much attention. Besides good color quality, the displays also need to have uniform luminance for providing good image quality. Take a liquid crystal display as an example, people can find out differences in luminance between different areas easily while they are observing the liquid crystal display carefully. When a photometer is used to measure the liquid crystal display, it is found that the detected luminance of different pixels with the same grayscale is not uniform. A larger difference in luminance is observed while comparing a central area with an edge area of the image. In order to improve uniformity of the display to comply with the standard, a luminance correction circuit is incorporated into the product and a stringent calibration procedure of display luminance is needed during production.

Moreover, each common matrix/heater unit has a little difference in properties while coming out of the factory. Thus the temperature of a part of area on the display may be too high or too low due to uneven heating caused by the matrix/heater. In order to achieve the uniform temperature, a temperature correction circuit is designed into the product and a temperature calibration procedure is added during production.

Thus a correction mechanism is required in displays for uniformity compensation of luminance, temperature, image color saturation, and spectrum.

SUMMARY OF THE INVENTION

Therefore it is a primary object of the present invention to provide a method for creating a uniformity compensation look-up table by which the non-uniform problem of a plane can be avoided and mosaic phenomenon doesn't appear while the method being applied to the image field. First a central uniform estimate is obtained by a plurality of measured values. Then get a plurality of planar uniform estimates of the plane by interpolation or extrapolation of a plurality of measured values and the central uniform estimate so as to establish the uniformity compensation look-up table for the following compensation.

It is another object of the present invention to provide a method for creating a uniformity compensation look-up table in which a plurality of planar uniform estimates of different positions on a circumference of a plurality of concentric circles on the plane are obtained by interpolation for uniformity compensation. Thus the present invention can be implemented by digital logic circuits and mosaic can be avoided while the method being applied to the image filed.

In order to achieve the above objects, a method for creating a uniformity compensation look-up table of the present invention includes the following steps. In the beginning, measure a plurality of areas on a plane users intend to make uniform to get a measured value of each area. Then get a central uniform estimate of a center of the plane according to the measured values and a distance between the position of each measured value and the center of the plane. Get a linear skeleton according to the position of each measured value and the center. Next get a plurality of skeletal uniform estimates on the linear skeletons respectively by interpolation or extrapolation of the measured values, the central uniform estimate, and the distance between the position of each of the measured values and the center of the plane. At last get a plurality of planar uniform estimates on the plane in turn according to the skeletal uniform estimates of the adjacent linear skeletons. Thereby a uniformity compensation look-up table is established to avoid both non-uniform problem of the plane and the mosaic phenomenon of the image.

Moreover, the step of getting a plurality of planar uniform estimates on the plane in turn according to the skeletal uniform estimates of the adjacent linear skeletons further includes the following steps. Get a plurality of planar uniform estimates of different positions on a circumference of a circle by using interpolation of the skeletal uniform estimates on intersections of the two adjacent linear skeletons and the circle. Then repeat the above step to get a plurality of planar uniform estimates of different positions on a circumference of a plurality of concentric circles having different radii and the same center as the above circle on the plane in turn. Thus the uniformity compensation is achieved by digital logic circuits and mosaic of the image can be avoided.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

In order to learn features and functions of the present invention, please refer to the figures and the following embodiments with detailed descriptions.

Figure 1:
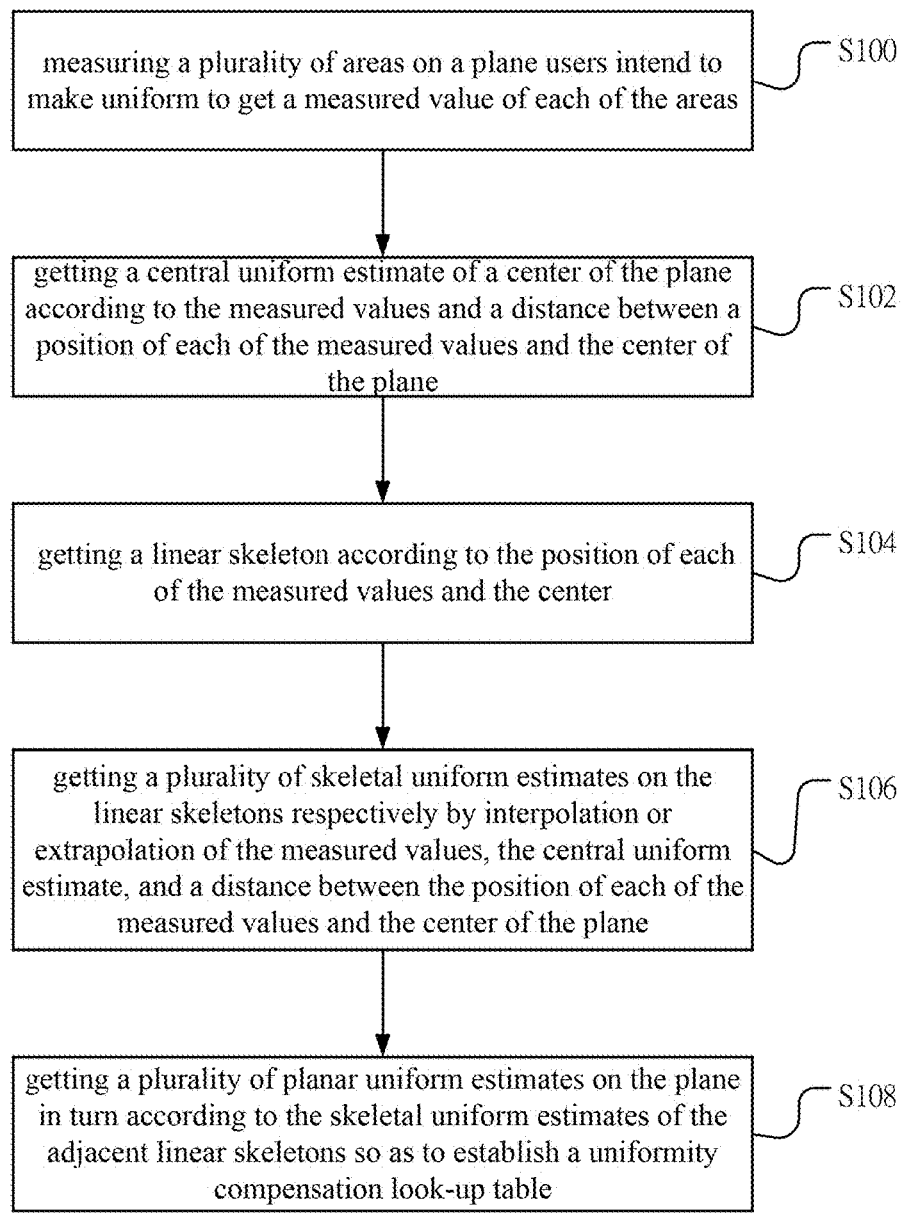
FIG. 1 is a flow chart showing steps of an embodiment according to the present invention.
Figure 3A:
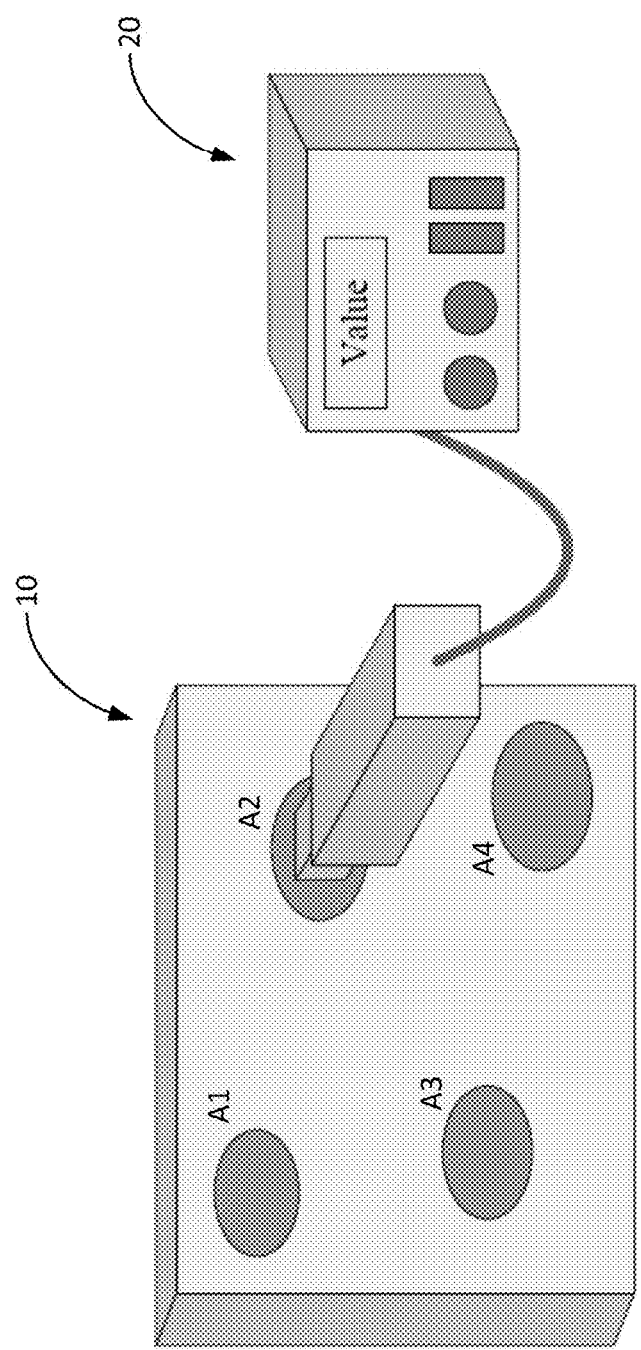
FIG. 3A is a schematic drawing showing a step of an embodiment according to the present invention.

Refer to FIG. 1, a flow chart showing steps of a method of the present invention is revealed. Refer to step S100, measure a plurality of areas on a plane users intend to make uniform to get a measured value of the respective area. As shown in FIG. 3A, a measuring instrument 20 is used to measure a plurality of measurement areas A1, A2, A3, and A4 on a plane 10 and a plurality of measured values V1, V2, V3, V4 corresponding to the area respectively is obtained. In this embodiment, there are four measurement areas A1, A2, A3, and A4 on the plane 10 measured by the measuring instrument 20 There is no restriction on the number of the measurement area as long as the number is no less than two. The more measurement areas on the plane 10, the better the uniformity compensation for the plane 10.

The measurement areas A1, A2, A3, and A4 can also be points respectively. Thus the measuring instrument 20 is used to measure the value of each point directly. Once A1, A2, A3, or A4 is an area, the measuring instrument 20 measures a plurality of points within the area to get a plurality of detected values. Then get a mean of the detected values. Thus the measured value of the respective area (V1, V2, V3, V4) is obtained.

Figure 3B:
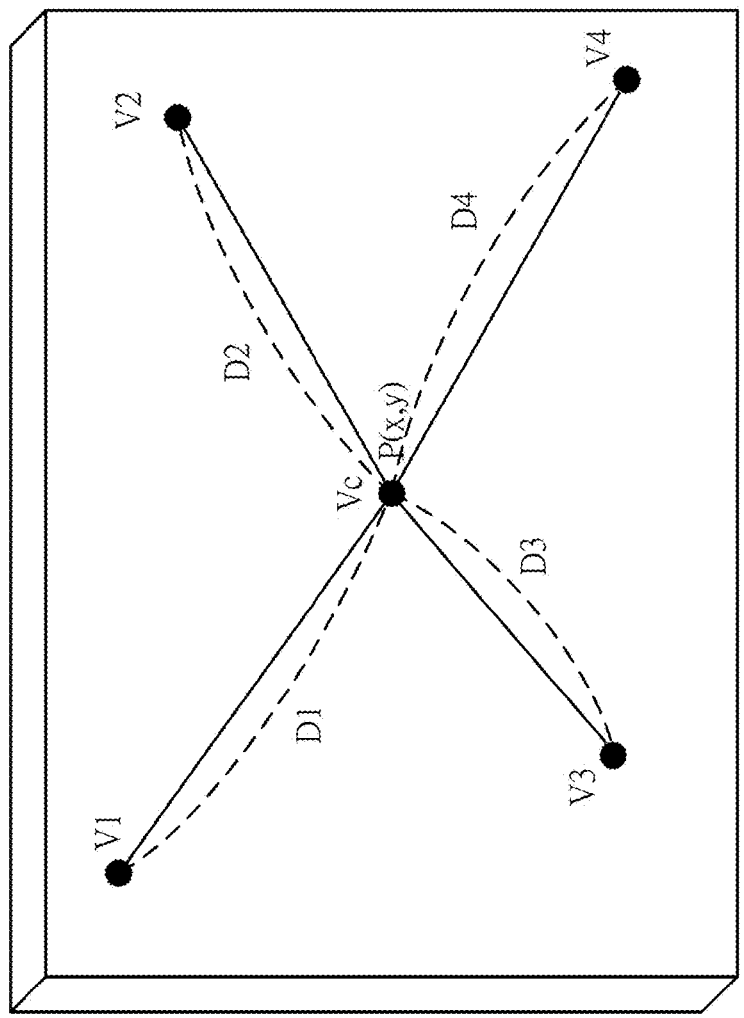
FIG. 3B is a schematic drawing showing a step of an embodiment according to the present invention.

Refer to the step S102 in FIG. 1, get a central uniform estimate of a center of the plane according to the measured values and a distance between the position of each of the measured values and the center of the plane. The position of the measured value can be an area or a point. As shown in FIG. 3B, calculate the distance D1, D2, D3, and D4 between the position of each of the measured values V1, V2, V3, V4 and the center P (x,y) of the plane 10 after getting the measured values V1, V2, V3, V4. Then get the central uniform estimate $V_C$ according to the measured values V1, V2, V3, V4 and the distances D1, D2, D3, D4. An equation for calculating the central uniform estimate $V_C$ is as the following:

$$V_C = \left(V1*\left(1-\frac{D1}{Tmp}\right)\right) + \left(V2*\left(1-\frac{D2}{Tmp}\right)\right) + \ldots + \left(Vn*\left(1-\frac{Dn}{Tmp}\right)\right) \quad (1)$$

wherein Tmp is total distance of line D1+line D2+ . . . +line Dn (Tmp=D1+D2+ . . . +Dn).

This equation is for a number of n measured values. Take the embodiment in FIG. 3B as an example. There are four points being measured in this embodiment. The central uniform estimate $V_C$ of the enter P (x,y) is calculated by the following equation (2):

$$V_C = \left(V1*\left(1-\frac{D1}{Tmp}\right)\right) + \left(V2*\left(1-\frac{D2}{Tmp}\right)\right) + \left(V3*\left(1-\frac{D3}{Tmp}\right)\right) + \left(V4*\left(1-\frac{D4}{Tmp}\right)\right) \quad (2)$$

wherein Tmp D1+D2+D3+D4.

Figure 3C:
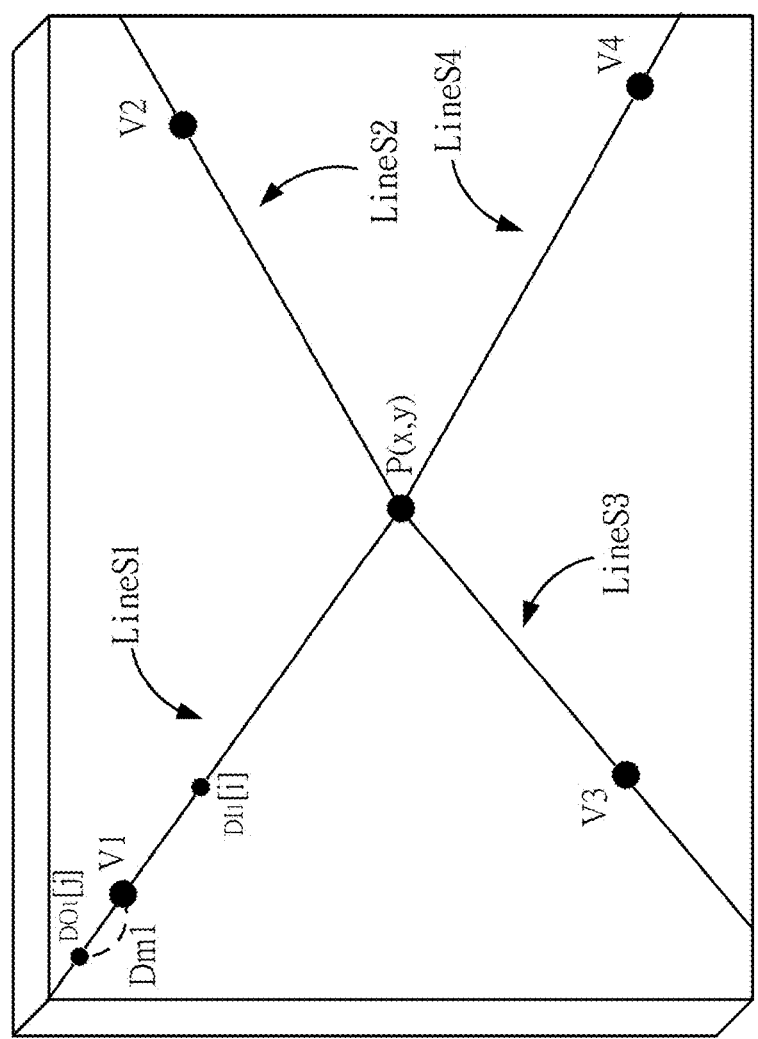
FIG. 3C is a schematic drawing showing a step of an embodiment according to the present invention.

Refer to the step S104 in FIG. 1, get a linear skeleton according to the position of each of the measured values and the center. Refer to FIG. 3C, a linear skeleton such as LineS1 is represented by a line passing through the center P (x,y) and the position of the measured value V1 since two points define a line. Thus a plurality of linear skeletons LineS1, LineS2, LineS3, and LineS4 is obtained by lines passing through the center P (x,y) of the plane 10 and the positions of the measured values V1 V2, V3, V4 respectively. Then run the step S106, get a plurality of skeletal uniform estimates (of different positions) on the linear skeletons LineS1, LineS2, LineS3, and LineS4 respectively by interpolation or extrapolation of the measured values V1, V2, V3, V4, the central uniform estimate $V_C$, and the distance D1, D2, D3, and D4 between the position of each of the measured values V1, V2, V3, V4 and the center P (x,y) of the plane 10. In this embodiment, use interpolation to get skeletal uniform estimate of a point on the linear skeletons LineS1, LineS2, LineS3, and LineS4 when the distance between the point to be calculated and the center P (x,y) of the plane 10 is smaller than the distance between the position of the measured value V1, V2, V3, or V4 and the center P (x,y) of the plane 10. On the other hand, extrapolation is used to get skeletal uniform estimate of a point on the linear skeletons LineS1, LineS2, LineS3, and LineS4 when the distance between the point to be calculated and the center P (x,y) of the plane 10 is larger than the distance between the position of the measured value V1, V2, V3, or V4 and the center P (x,y) of the plane 10.

Take the linear skeleton LineS1 as an example. Use interpolation to get skeletal uniform estimate $DI_1[i]$ on the linear skeletons1 when the distance between the position/point of the skeletal uniform estimate $DI_1[i]$ and the center P (x,y) of the plane 10 is smaller than the distance D1 between the position of the measured value V1 and the center P (x,y) of the plane 10. The $DI_1[i]$ is calculated by the following equation (3):

$$DI_1[i] = \left(V1*\left(\frac{i}{D1}\right)\right) + \left(V_C*\left(1-\frac{i}{D1}\right)\right) \quad (3)$$

wherein i=0~N, there are a number of N skeletal uniform estimates on the linear skeleton LineS1.

Use extrapolation to get skeletal uniform estimate $DO_1[i]$ on the linear skeletons1 when the distance $D_m1$ between the point (the position of the skeletal uniform estimate $DO_1[i]$) and the center P (x,y) of the plane 10 is larger than the distance D1 between the position of the measured value V1 and the center P (x,y) of the plane 10. Since the position of the measured value V1 is located between the position of the skeletal uniform estimate $DO_1[i]$ (point) and the center P (x,y) of the plane 10, the measured value V1 can be calculated by using interpolation of the skeletal uniform estimate $DO_1[i]$ and the central uniform estimate $V_C$, as shown in the following equation (4).

$$V1 = DO_1[j]*\left(\frac{D1}{D1+D_m1}\right) + V_{C*}\left(\frac{D_m1}{D1+D_m1}\right) \quad (4)$$

wherein j=0~M. The above equation (4) is transformed into the following equation (5) that gets the skeletal uniform estimate $DO_1[i]$ by extrapolation:

$$DO_1[j] = \frac{V1*(D1+D_m1) - V_C*D_m1}{D1} \quad (5)$$

Thus the skeletal uniform estimate of each point on the linear skeleton LineS1 can be obtained. Similarly, the skeletal uniform estimate of each point on the linear skeletonS2, LineS3, LineS4 can be obtained by repeating the steps mentioned above.

At last, take the step S108, get a plurality of planar uniform estimates on the plane in turn according to the skeletal uniform estimates of the two adjacent linear skeletons. Take the embodiment in FIG. 3D as an example. The plane 10 is divided into a first area AREA1, a second are AREA2, a third area AREA3 and a fourth area AREA4 by the four linear skeletons LineS1, LineS2, LineS3, and LineS4. The first area AREA1 is located between the linear skeleton LineS1 and the linear skeleton LineS2. The planar uniform estimates on the first area AREA1 is calculated by interpolation of the skeletal uniform estimates on the linear skeleton LineS1 and the skeletal uniform estimates on the linear skeleton LineS2.

The second area AREA2 is located between the linear skeleton LineS1 and the linear skeleton LineS3. Thus the planar uniform estimates on the second area AREA2 is calculated by interpolation of the skeletal uniform estimates on the linear skeleton LineS1 and the skeletal uniform estimates on the linear skeleton LineS3. The third area AREA3 is located between the linear skeleton LineS3 and the linear skeleton LineS4. Thus the planar uniform estimates on the third area AREA3 is calculated by interpolation of the skeletal uniform estimates on the linear skeleton LineS3 and the skeletal uniform estimates on the linear skeleton LineS4. The fourth area AREA4 is located between the linear skeleton LineS2 and the linear skeleton LineS4. Thus the planar uniform estimates on the fourth area AREA4 is calculated by interpolation of the skeletal uniform estimates on the linear skeleton LineS2 and the skeletal uniform estimates on the linear skeleton LineS4.

The followings are a plurality of methods that get the planar uniform estimates by using interpolation of the skeletal uniform estimates on the adjacent linear skeletons.

Figure 2:
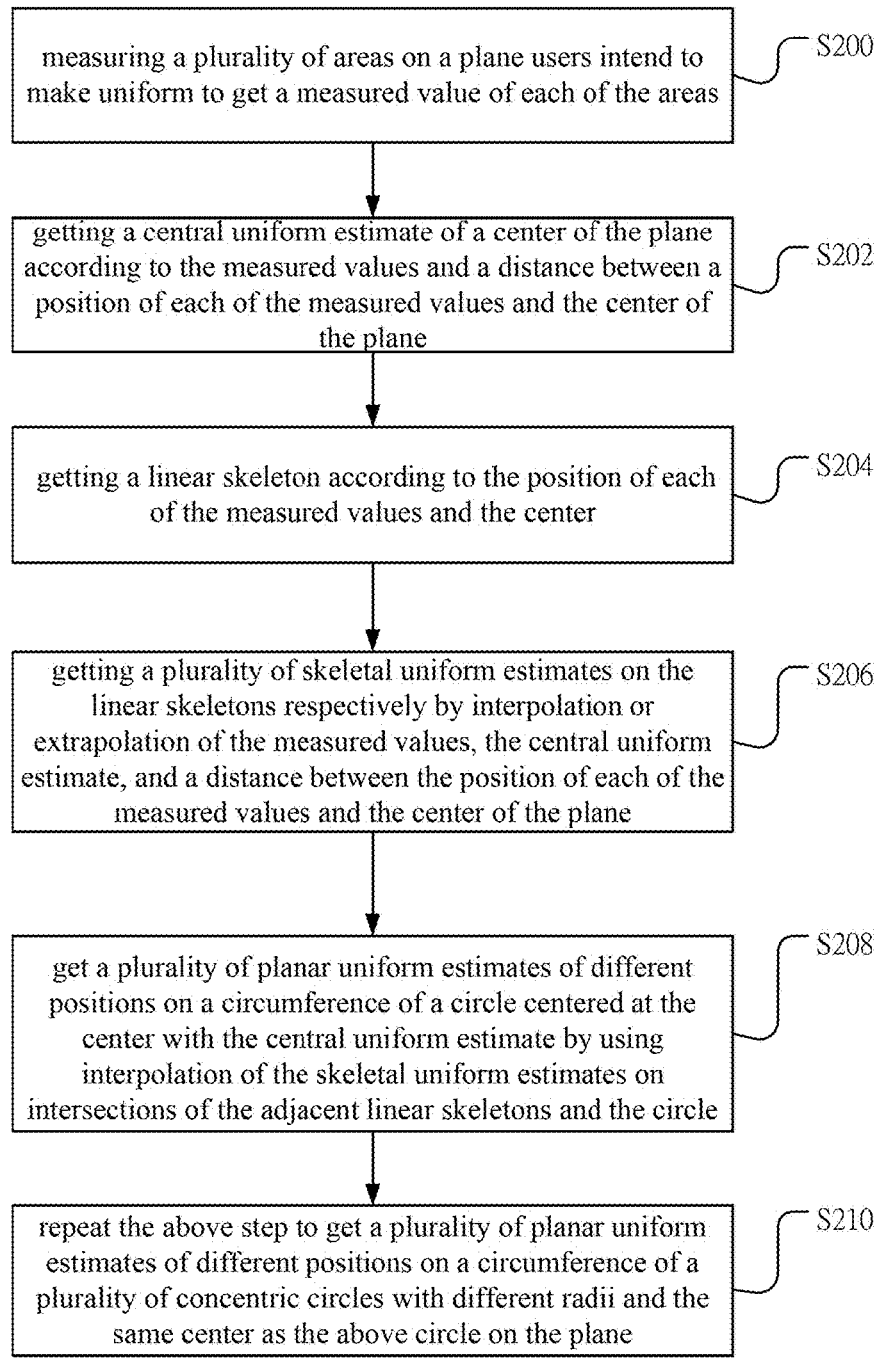
FIG. 2 is a flow chart showing steps of another embodiment according to the present invention.
Figure 3D:
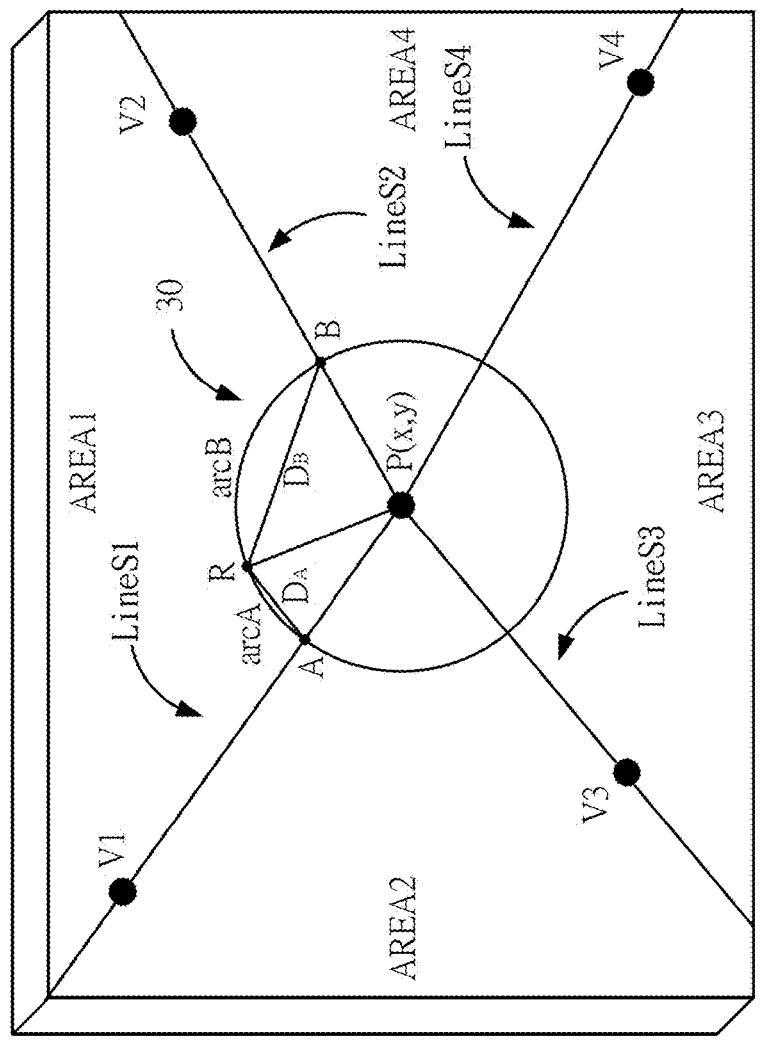
FIG. 3D is a schematic drawing showing a step of an embodiment according to the present invention.

Refer to FIG. 2, a flow chart showing steps of another embodiment is revealed. The difference between this embodiment and the embodiment shown in FIG. 1 is in the step S208, get a plurality of planar uniform estimates of different positions on a circumference of a circle centered at the center with the central uniform estimate by using interpolation of the skeletal uniform estimates on intersections of the adjacent linear skeletons and the circle. First the skeletal uniform estimates on the two adjacent linear skeletons are obtained in turn in the previous step. Refer to FIG. 3D, the plane 10 is divided into a first area AREA1, a second are AREA2, a third area AREA3 and a fourth area AREA4 by the four linear skeletons LineS1, LineS2, LineS3, and LineS4. Within the first area AREA1, get a skeletal uniform estimate A on the intersection of the linear skeleton LineS1 and the circle 30. Also get a skeletal uniform estimate B on the intersection of the linear skeleton LineS2 and the circle 30.

Then the planar uniform estimates of different positions on the circumference of the circle 30 within the first area AREA1 between the two adjacent linear skeletons LineS1 and LineS2 are obtained by using interpolation of the skeletal uniform estimates A and B according to the ratio of the arc length between a point on the circumference and one of intersections to the arc length between the point and the other intersection. Next the planar uniform estimates of different positions on the circumference of the circle between the two points having the skeletal uniform estimates A and B are obtained by interpolation of the skeletal uniform estimate A on the linear skeleton LineS1 and the skeletal uniform estimate B on the linear skeleton LineS2. Take a point R as an example. The point R is on the circumference of the circle 30 and located at the first area AREA1 between the two adjacent linear skeletons LineS1 and LineS2. Thus the planar uniform estimate of the point R is calculated by interpolation of the skeletal uniform estimate A on the linear skeleton LineS1 and the skeletal uniform estimate B on the linear skeleton LineS2, as shown in the following equation (6):

$$R = \left(A * \frac{\text{arc}B}{\text{arc}AB}\right) + \left(B * \frac{\text{arc}A}{\text{arc}AB}\right) \quad (6)$$

wherein R represents the planar uniform estimate of the point R; arcA represents arc length A; arcB represents arc length B; arcAB represents arc length AB; both arcA and arcB are a part of arcAB; arcAB=arcA+arcB; arc length A equals a radius r of the circle 30 times the angle ψ; arc length B equals the radius r times the angle θ.

Moreover, the planar uniform estimates on the circumference of the circle between the two adjacent linear skeletons LineS1, LineS2, LineS3 and LineS4 can also obtained by using interpolation of the skeletal uniform estimates of the adjacent linear skeletons LineS1, LineS2, LineS3, and LineS4 according to the ratio of the distance between a point on the circumference and one of the intersections to the distance between the point and the other intersection. Also take the point R as an example. The point R is on the circumference of the circle 30 and located at the first area AREA1 between the two adjacent linear skeletons LineS1 and LineS2. Thus the planar uniform estimate of the point R is calculated by interpolation of the skeletal uniform estimate A on the linear skeleton LineS1, the distance $D_A$ between the point R and a point on the linear skeleton LineS1 with the skeletal uniform estimate A, the skeletal uniform estimate B on the linear skeleton LineS2 and the distance $D_B$ between the point R and a point on the linear skeleton LineS2 with the skeletal uniform estimate B, as shown in the following equation (7):

$$R = \left(A * \frac{D_B}{D_A + D_B}\right) + \left(B * \frac{D_A}{D_A + D_B}\right) \quad (7)$$

wherein R represents the planar uniform estimate of the point R; $D_A$ is the distance between the point R and a point on the linear skeleton LineS1 with the skeletal uniform estimate A; $D_B$ is the distance between the point R and a point on the linear skeleton LineS2 with the skeletal uniform estimate B.

Repeat the above steps until the planar uniform estimate of each position/point on the circumference of the circle 30 within the first area AREA1 is obtained. Then the planar uniform estimates on the circumference of the circle 30 within the second area AREA2, the third area AREA3 and the fourth AREA 4 are calculated in turn by interpolation of the skeletal uniform estimates of the adjacent linear skeletons LineS1, LineS2, LineS3, and LineS4.

Figure 3E:
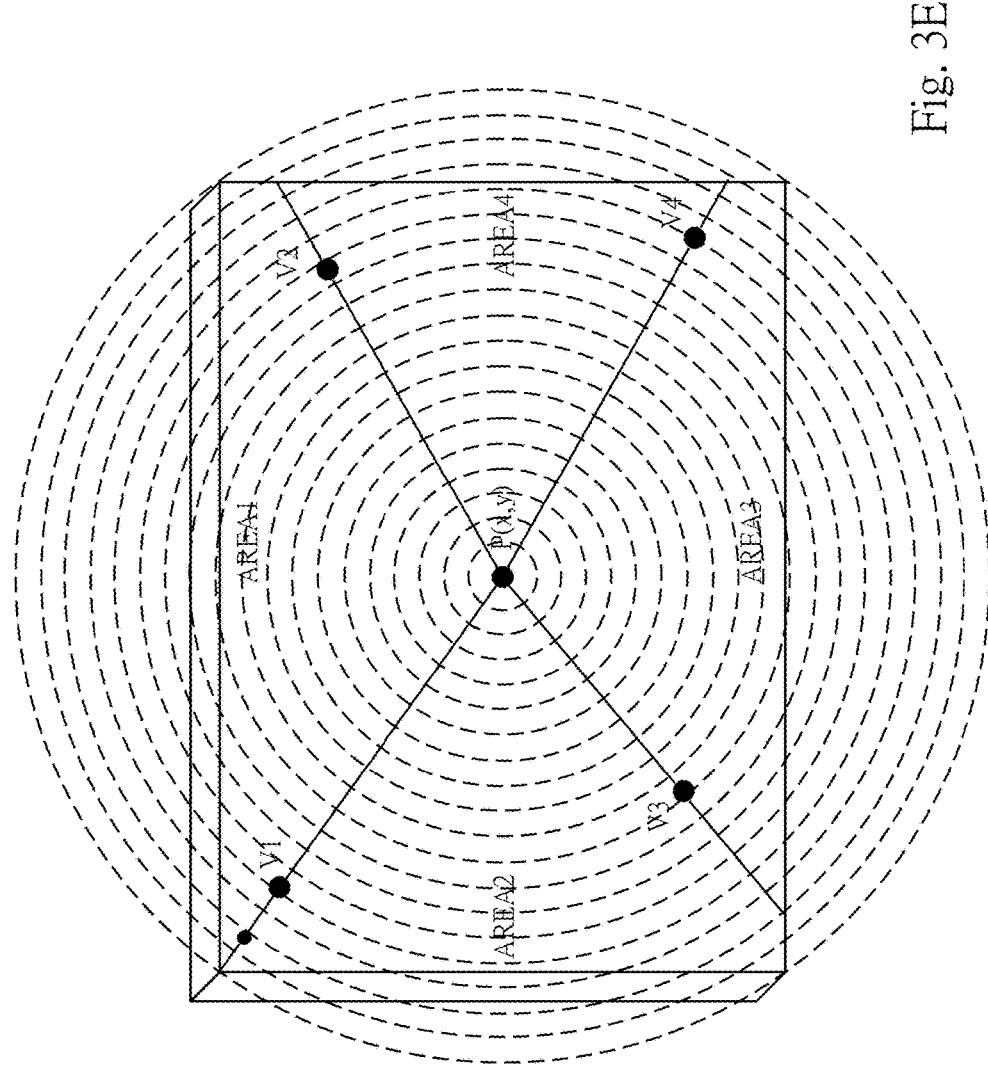
FIG. 3E is a schematic drawing showing a step of an embodiment according to the present invention.

Next take the step S210, repeat the above step to get a plurality of planar uniform estimates of different positions on a circumference of a plurality of concentric circles with different radii and the same center as the above circle on the plane 10. The concentric circles are around the same center P (x,y) with the central uniform estimate $V_C$. As shown in FIG. 3E, get a plurality of planar uniform estimates of different positions on the circumference of concentric circles with a smaller radius. Then get planar uniform estimates of different positions on the circumference of concentric circles with a larger radius. At last, the planar uniform estimates of different positions on the circumference of a concentric circle with the largest radius on the plane 10. Thereby a uniformity compensation look-up table is created. The present invention gets uniform estimates of each point on the plane 10 (including the central uniform estimate, the skeletal uniform estimates, and planar uniform estimates) by the measured values so as to create a uniformity compensation look-up table of the plane 10. Take luminance as an example. The luminance is generally represented by a number ranging from 0-150 and each pixel of an image is set with a specific number of luminance. Thus there are 256 uniformity compensation look-up table required to be established. A corresponding uniformity compensation look-up table can be found out for compensation while showing the luminance of the image. For example, the display circuit finds out the corresponding uniformity compensation lookup table and performs compensation according to the lookup table when the image needs the luminance value of 250.

Furthermore, the present invention can't only be applied to luminance, it can also be applied to illuminance, spectrum, temperature, or other physical values able to be shown on a plane.

Figure 4:
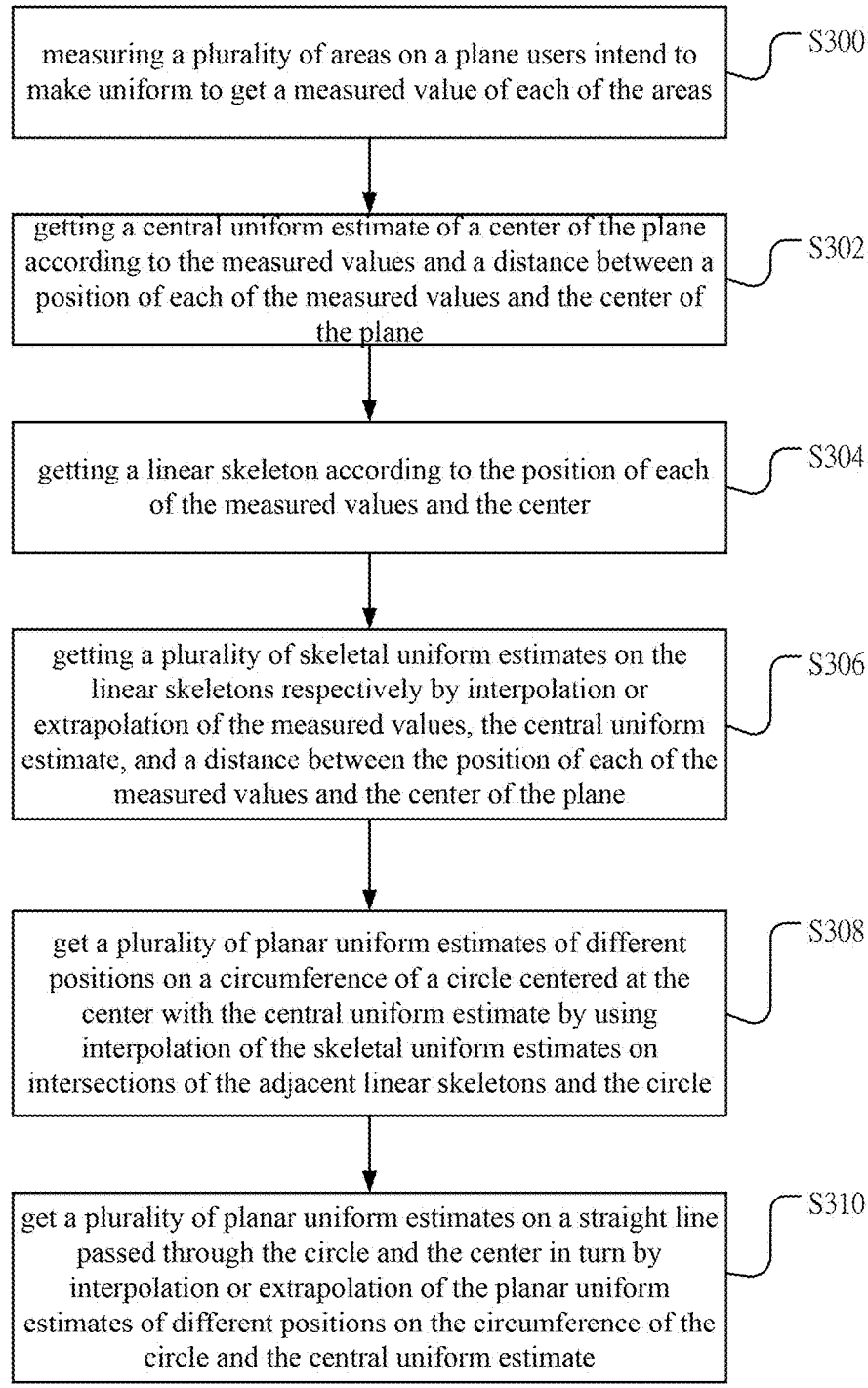
FIG. 4 is a flow chart showing steps of a further embodiment according to the present invention.
Figure 5A:
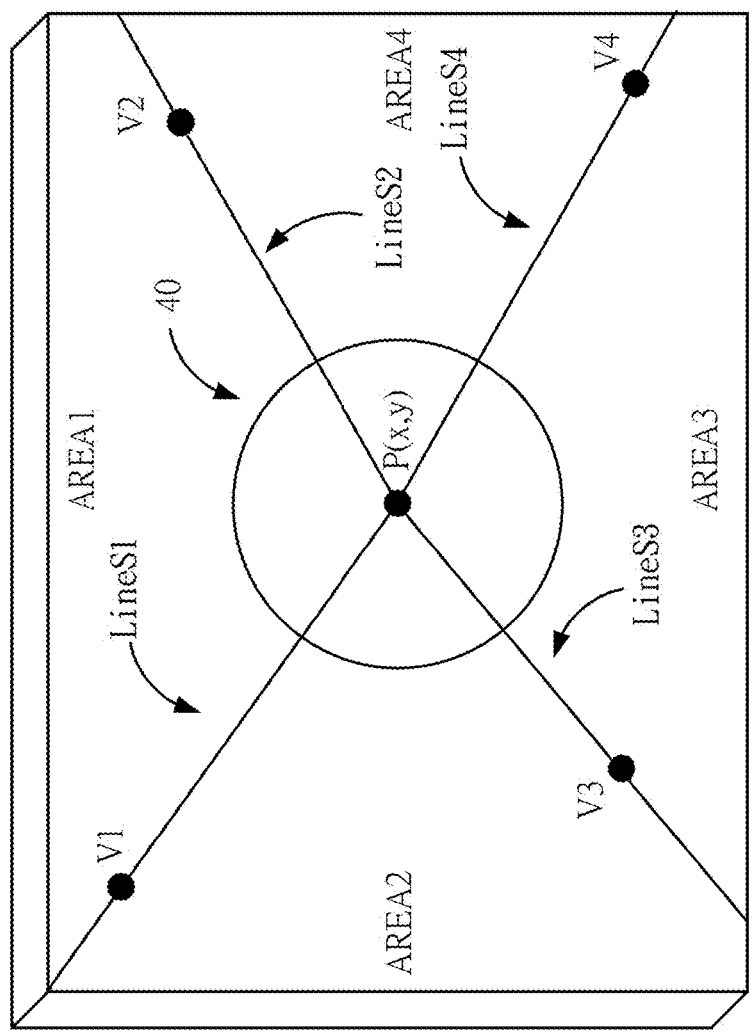
FIG. 5A is a schematic drawing showing a step of the embodiment in FIG. 4 according to the present invention.

Refer to FIG. 4, a further embodiment is revealed. The difference between this embodiment and the embodiment in FIG. 2 is in the last step. Refer to the step S308, get a plurality of planar uniform estimates of different positions on a circumference of a circle centered at the center with the central uniform estimate by using interpolation of the skeletal uniform estimates on intersections of the two adjacent linear skeletons and the circle. Refer to FIG. 5A, the plane 10 is divided into a first area AREA1, a second are AREA2, a third area AREA3 and a fourth area AREA4 by the four linear skeletons LineS1, LineS2, LineS3, and LineS4 and so is the circumference of a circle 40. The planar uniform estimates of different positions on the circumference of the circle 40 within the first area AREA1, the second are AREA2, the third area AREA3 and the fourth area AREA4 are calculated by interpolation of the skeletal uniform estimates on the intersections of the two adjacent linear skeletons LineS1, LineS2, LineS3, and LineS4 and the circle 40.

Figure 5B:
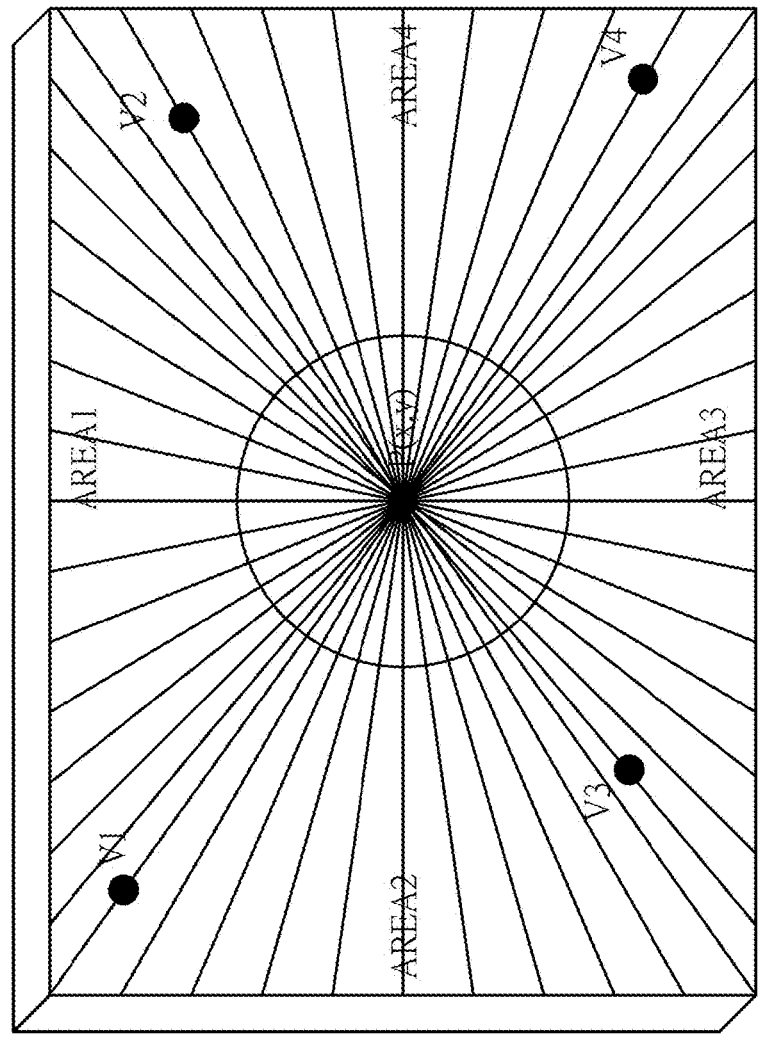
FIG. 5B is a schematic drawing showing a step of the embodiment in FIG. 4 according to the present invention.

Then run the step S310, get a plurality of planar uniform estimates on a straight line passed through the circle and the center in turn by interpolation or extrapolation of the planar uniform estimates of different positions on the circumference of the circle and the central uniform estimate. Also refer to FIG. 5B, after learning the plurality of planar uniform estimates of different positions on the circumference of the circle 40 in the above step (S308), get a plurality of planar uniform estimates on one line passed through the circle and the center P (x,y) in turn by interpolation or extrapolation of the planar uniform estimates of the circumference of the circle 40 and the central uniform estimate $V_C$, similar to the step S304. Then repeat the above steps to get a plurality of planar uniform estimates on other lines passed through the circle 40 and the center P (x,y) with the central uniform estimate of $V_C$ in turn by interpolation or extrapolation of the planar uniform estimates of different positions on the circumference of the circle and the central uniform estimate $V_C$. Thus the planar uniform estimates on the plane 10 are all obtained.

Figure 6:
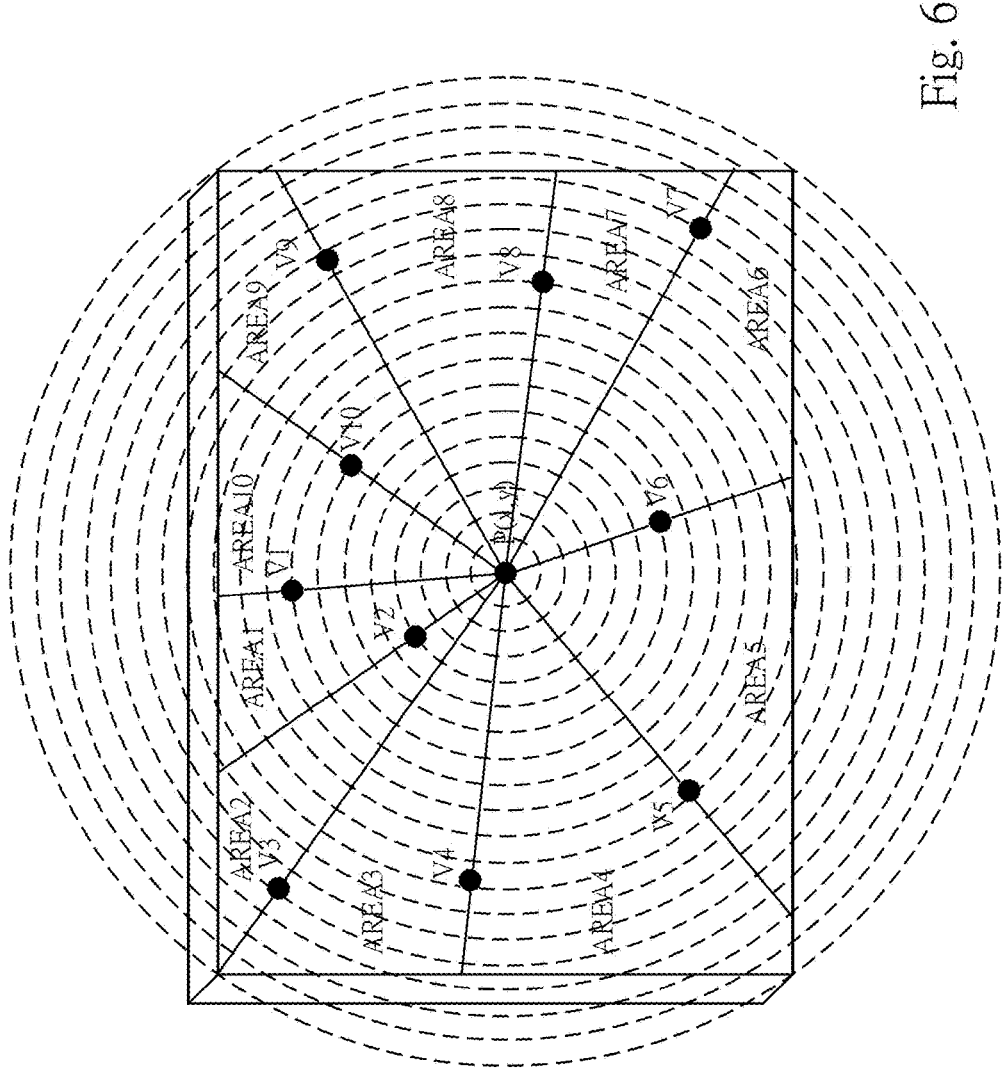
FIG. 6 is a schematic drawing showing a further embodiment with 10 measurement points for calculation according to the present invention.

Refer to FIG. 6, a schematic drawing showing a further embodiment with 10 measured points. As shown in the figure, there are 10 measured points by which the plane 10 is cut into 10 areas for uniformity compensation. The more measured points used, the more areas the plane 10 being divided into. Thus the better effect is provided. Yet the computational complexity is higher. The number of the measured points is no less than two.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A method for creating a uniformity compensation look-up table comprising the steps of:

measuring a plurality of areas on a plane users intend to make uniform to get a measured value of each of the areas;

getting a central uniform estimate of a center of the plane according to the measured values and a distance between a position of each of the measured values and the center of the plane;

getting a linear skeleton according to the position of each of the measured values and the center;

getting a plurality of skeletal uniform estimates on the linear skeletons respectively by interpolation or extrapolation of the measured values, the central uniform estimate, and a distance between the position of each of the measured values and the center of the plane; and getting a plurality of planar uniform estimates on the plane in turn according to the skeletal uniform estimates of the adjacent linear skeletons so as to establish a uniformity compensation look-up table.

2. The method as claimed in claim 1, wherein the step of getting a plurality of planar uniform estimates on the plane in turn according to the skeletal uniform estimates of the adjacent linear skeletons further includes steps of:

getting a plurality of planar uniform estimates of different positions on a circumference of a circle centered at the center by using interpolation of the skeletal uniform estimates on intersections of the adjacent linear skeletons and the circle; and repeating the above step to get a plurality of planar uniform estimates of different positions on a circumference of a plurality of concentric circles having different radii and the same center as the circle on the plane in turn.

3. The method as claimed in claim 2, wherein the step of getting a plurality of planar uniform estimates of different positions on a circumference of a circle centered at the center by using interpolation of the skeletal uniform estimates on intersections of the adjacent linear skeletons and the circle further includes steps of:

getting the planar uniform estimates of different positions on the circumference of the circle between the adjacent linear skeletons by using interpolation of the skeletal uniform estimates of the adjacent linear skeletons according to a ratio of an arc length between the position on the circumference and one of the intersections to an arc length between the position on the circumference and the other intersection; and repeating the above step to get all the planar uniform estimates on each of the positions on the circumference of the circle.

4. The method as claimed in claim 2, wherein the step of getting a plurality of planar uniform estimates of different positions on a circumference of a circle centered at the center by using interpolation of the skeletal uniform estimates on intersections of the adjacent linear skeletons and the circle further includes steps of:

getting the planar uniform estimates of different positions on the circumference of the circle between the adjacent linear skeletons by using interpolation of the skeletal uniform estimates of the adjacent linear skeletons according to a ratio of a distance between the position on the circumference and one of the intersections to a distance between the position on the circumference and the other intersection; and repeating the above step to get all the planar uniform estimates on each of the positions on the circumference of the circle.

5. The method as claimed in claim 1, wherein the step of getting a plurality of planar uniform estimates on the plane in turn according to the skeletal uniform estimates of the adjacent linear skeletons further includes steps of:

getting a plurality of planar uniform estimates of different positions on a circumference of a circle by using interpolation of the skeletal uniform estimates on intersections of the adjacent linear skeletons and the circle; and getting a plurality of planar uniform estimates on a straight line passed through the circle and the center in turn by interpolation or extrapolation of the planar uniform estimates of different positions on the circumference of the circle and the central uniform estimate.

6. The method as claimed in claim 1, wherein the step of measuring a plurality of areas on a plane users intend to make uniform to get a measured value of each of the areas further includes steps of:

measuring each of the areas on the plane to get a plurality of detected values; and averaging the detected values to get the measured value.

7. The method as claimed in claim 1, wherein use interpolation to get the plurality of skeletal uniform estimates when a distance between a position on the linear skeleton to be obtained and the center of the plane is smaller than a distance between the position of the measured value and the center of the plane; use extrapolation to get the plurality of skeletal uniform estimates when a distance between a position on the linear skeleton to be obtained and the center of the plane is larger than a distance between the position of the measured value and the center of the plane in the step of getting a plurality of skeletal uniform estimates on the linear skeletons respectively by interpolation or extrapolation of the measured values, the central uniform estimate, and a distance between the position of each of the measured values and the center of the plane.

8. The method as claimed in claim 1, wherein the method is able to be applied to a field selected from a group consisting of illuminance, spectrum, and temperature.

\* \* \* \* \*